(12) United States Patent
Uchiyama et al.

(10) Patent No.: US 8,298,691 B2
(45) Date of Patent: Oct. 30, 2012

(54) MAGNETIC RECORDING MEDIUM AND MAGNETIC RECORDING AND REPRODUCING APPARATUS

(75) Inventors: Yoshinori Uchiyama, Tokyo (JP); Takahiro Suwa, Tokyo (JP); Narutoshi Fukuzawa, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 318 days.

(21) Appl. No.: 12/659,407

(22) Filed: Mar. 8, 2010

(65) Prior Publication Data

US 2010/0239888 A1  Sep. 23, 2010

(30) Foreign Application Priority Data

Mar. 18, 2009  (JP) .................... 2009-066837

(51) Int. Cl.
*G11B 5/66* (2006.01)
(52) U.S. Cl. ........................................ 428/836
(58) Field of Classification Search ............ None
See application file for complete search history.

(56) References Cited

U.S. PATENT DOCUMENTS

| | | | |
|---|---|---|---|
| 6,014,296 A | 1/2000 | Ichihara et al. | |
| 7,776,388 B2* | 8/2010 | Dobisz et al. | 427/129 |
| 2005/0196644 A1* | 9/2005 | Itoh et al. | 428/835 |
| 2005/0196650 A1* | 9/2005 | Suwa et al. | 428/848 |

FOREIGN PATENT DOCUMENTS

JP    A-9-97419    4/1997

\* cited by examiner

*Primary Examiner* — Holly Rickman
(74) *Attorney, Agent, or Firm* — Oliff & Berridge, PLC

(57) ABSTRACT

A magnetic recording medium is provided in which recording elements and concave portions have a clear difference in terms of magnetism at the boundaries therebetween, and which has favorable production efficiency. The magnetic recording medium includes a substrate; a recording layer formed in a predetermined concavo-convex pattern over the substrate, convex portions of the concavo-convex pattern serving as recording elements; and a filler portion filling a concave portion between the recording elements. A center part of a bottom surface of the concave portion protrudes from edge parts of the bottom surface of the concave portion in a direction away from the substrate.

8 Claims, 14 Drawing Sheets

MAGNETIC RECORDING MEDIUM AND MAGNETIC RECORDING AND REPRODUCING APPARATUS

TECHNICAL FIELD

The present invention relates to a magnetic recording medium having a recording layer formed in a concavo-convex pattern, and a magnetic recording and reproducing apparatus including the same.

BACKGROUND ART

The areal density of conventional magnetic recording media such as hard disks has been significantly improved by, for example, reducing the size of magnetic particles constituting a recording layer, changing materials, and improving the precision of head processing. Further improvements in areal density are also expected in the future. The improvements in areal density by means of conventional improvement techniques are approaching their limit, however, due to the advent of such problems as processing limits of the magnetic head, erroneous recording of information on tracks adjoining an intended track because of a spreading recording field from the magnetic head, and crosstalk during reproduction.

Discrete track media and patterned media have been proposed as promising magnetic recording media that are capable of further improvements in areal density. In these media, a recording layer is formed in a concavo-convex pattern so that the convex portions of the concavo-convex pattern serve as recording elements (for example, see Patent Literature 1). For magnetic recording media such as hard disks, the surface flatness is a significant factor in stabilizing the head flying height in order to provide favorable recording and reproducing characteristics. It is therefore desirable to deposit a filler material over the recording layer of concavo-convex pattern so as to fill the concave portions between the recording elements with the filler material, and remove an excess of the filler material above the recording layer so that the upper surfaces of the recording elements and those of the filler material are flattened.

The filler material may be deposited to fill the concave portions by using a vacuum deposition method such as sputtering. To remove the excess of the filler material for surface flattening, a dry etching method such as ion beam etching (IBE) or a polishing method such as chemical mechanical polishing (CMP) can be used.

In order to suppress the erroneous recording of information on tracks adjoining an intended track and the crosstalk during reproduction, it is preferred that the recording elements be completely divided by the concave portions between the recording elements. For example, the recording elements can be completely divided from each other by forming concave portions with sufficient depth between them.

The deeper the concave portions between the recording elements are, the thicker the filler material needs to be deposited to fill the concave portions between the recording elements. The deeper concave portions thus make the step of depositing the filler material less efficient.

The filler material is formed in a concavo-convex pattern that follows a concavo-convex pattern of the recording layer. The deeper the concave portions between the recording elements are and the greater the difference in level between the concavities and convexities of the concavo-convex pattern of the recording layer is, the greater the difference in level between the concavities and convexities on the upper surface of the deposited filler material is. In the step of flattening the upper surfaces of the recording elements and those of the filler material, the concavities and convexities on the upper surface of the filler material gradually decrease as the excess of the filler material above the recording layer is being removed. When the concave portions between the recording elements are deep and the difference in level between the concavities and convexities on the upper surface of the deposited filler material is large, the upper surfaces of the recording elements and those of the filler material fail to be sufficiently flattened unless the excess of the filler material is thick. When the concave portions between the recording elements are deep, the filler material therefore needs to be deposited accordingly thick to produce a sufficiently thick excess of the filler material. This also makes the step of depositing the filler material less efficient.

The thick excess of the filler material above the recording layer also reduces the efficiency of the step where the excess of the filler material is removed to flatten the upper surfaces of the recording elements and those of the filler material.

In short, there is the problem that the deeper the concave portions between the recording elements are, the lower the production efficiency becomes. Consequently, it seems to be preferable that the concave portions between the recording elements be formed so that the bottom surfaces of the concave portions coincide with the upper surface of the layer that lies under the recording layer.

CITATION LIST

Patent Literature

Patent Literature 1: Japanese Patent Application Laid-Open No. Hei 9-97419

SUMMARY OF INVENTION

Technical Problem

In fact, however, it is difficult to form the concave portions between the recording elements so that the bottom surfaces of the concave portions coincide with the upper surface of the layer under the recording layer, and it has often been the case that the recording layer remains on the bottom surfaces of the concave portions. The recording elements and the concave portions sometimes have no clear difference in terms of magnetism at the boundaries therebetween for the remaining recording layer, failing to provide favorable recording and reproducing characteristics.

It has also been the case that even if the filler material is thickly deposited to produce a sufficiently thick excess of the filler material before the removal of the excess of the filler material, the upper surfaces of the recording elements and those of the filler material sometimes fail to be flattened. More specifically, the upper surfaces of the filler material filling the respective concave portions are sometimes shaped so that the center parts of the upper surfaces sink to the substrate side as compared to the edge parts of the upper surfaces.

In view of the foregoing problems, various exemplary embodiments of this invention provide a magnetic recording medium in which recording elements and concave portions have a clear difference in terms of magnetism at the boundaries therebetween and which has favorable production efficiency, and a magnetic recording and reproducing apparatus including the magnetic recording medium.

Solution to Problem

The foregoing object of the present invention has been achieved by the provision of a magnetic recording medium including: a substrate; a recording layer formed in a predetermined concavo-convex pattern over the substrate, convex portions of the concavo-convex pattern serving as recording elements; and a filler portion filling a concave portion between the recording elements, a center part of a bottom surface of the concave portion protruding from edge parts of the bottom surface of the concave portion in a direction away from the substrate.

In the process of achieving the present invention, the inventors have made an intensive study on the reason why the upper surfaces of the filler material filling the respective concave portions are shaped so that the center parts of the upper surfaces sink to the substrate side as compared to the edge parts of the upper surfaces even if the filler material is thickly deposited to produce a sufficiently thick excess of the filler material before the removal of the excess of the filler material. The findings are as follows.

The filler material is formed in a concavo-convex pattern that follows the concavo-convex pattern of the recording layer. The upper surface of the filler material, however, is not in strict accordance with the concavo-convex pattern of the recording layer in shape. As in a workpiece 100 shown in FIG. 23, the areas of the upper surface of the filler material 17 corresponding to the corners of the concavo-convex pattern of the recording layer 14 are shaped slightly rounder than the corners of the concavo-convex pattern of the recording layer. This makes the filler material 17 thicker over the edge parts of the bottom surfaces of the concave portions 16 of the concavo-convex pattern of the recording layer 14 than over the center parts of the bottom surfaces of the concave portions 16. In the step of flattening the upper surfaces of the recording elements 14A and those of the filler material 17, the concavities and convexities on the upper surface of the filler material 17 gradually decrease as the excess of the filler material 17 above the recording layer 14 is being removed. Though the convex portions of the filler material 17 tend to be removed selectively faster than the concave portions, the difference in thickness between the edge parts of the concave portions and the center parts of the concave portions is less likely to decrease. If the deposited filler material 17 has a large difference in thickness between the edge parts of the concave portions and the center parts of the concave portions, the difference can be left even after the removal of the filler material 17 from above the recording elements 14A. As shown in FIG. 24, the upper surfaces of the filler portions 18 (filler material 17) filling the respective concave portions 16 are thus shaped so that the center parts of the upper surfaces sink to the substrate side as compared to the edge parts of the upper surfaces. The greater the width of the concave portions is, the greater the difference in height between the center parts and the edge parts of the upper surfaces of the filler portions 18 filling the concave portions 16 tend to be.

In contract, according to the magnetic recording medium described above, the center part of the bottom surface of the concave portion between the recording elements protrudes from the edge parts of the bottom surface in the direction away from the substrate. The difference in height between the center part and the edge parts of the upper surface of the filler portion filling the concave portion is thus suppressed to be smaller than when the concave portion has a flat bottom surface. Consequently, in the step of flattening the upper surfaces of the recording elements and those of the filler material, it is possible to sufficiently reduce the difference in the height of the upper surface of the filler material between over the edge parts of the concave portion between the recording elements and over the center part of the concave portion.

In the foregoing magnetic recording medium, the edge parts of the bottom surface of the concave portion between the recording elements sink to the substrate side as compared to the center part of the bottom surface. This clarifies the magnetic difference between the recording elements and the concave portion at their boundaries.

Suppose, for example, that the concave portion between the recording elements is formed so that the bottom surface of the concave portion coincides with the upper surface of the layer that lies under the recording layer. Even if the recording layer is partly left on the bottom surface of the concave portion, the recording layer remains in the center part of the bottom surface of the concave portion and not at the edge parts. This clarifies the magnetic difference between the recording elements and the concave portion at their boundaries.

Alternatively, even when the recording layer is left over the entire bottom surface of the concave portion, the recording layer remaining in the concave portion is thinner in the edge parts of the bottom surface of the concave portion than in the center part of the bottom surface of the concave portion. This makes the magnetic difference between the recording elements and the concave portion at their boundaries clearer than when the recording layer lying in the concave portion has a constant thickness.

Accordingly, various exemplary embodiments of this invention provide a magnetic recording medium comprising: a substrate; a recording layer formed in a predetermined concavo-convex pattern over the substrate, convex portions of the concavo-convex pattern serving as recording elements; and a filler portion filling a concave portion between the recording elements, wherein the concave portion has a bottom surface including a center part and edge parts, the center part protruding from the edge parts in a direction away from the substrate.

As employed herein, the phrase "a recording layer formed in a concavo-convex pattern, convex portions of the concavo-convex pattern serving as recording elements" shall not only refer to a recording layer that is formed by dividing a continuous recording layer in a predetermined pattern so that the convex portions serving as the recording elements are completely separated from each other. The phrase shall also refer to the following: a recording layer that has convex portions which are mutually separated in data regions and continuous near boundaries between the data regions and servo regions; a recording layer that is continuously formed over a part of the substrate, like one having a spiral configuration; a recording layer that is formed on the upper surfaces of convex portions and the bottom surfaces of concave portions of an underlying layer of concavo-convex pattern separately so that the portions formed on the upper surfaces of the convex portions serve as recording elements; a recording layer that is continuous at the bottom, with concave portions formed halfway between the upper and lower surfaces of the recording layer; and a recording layer of continuous film that is deposited in a concavo-convex pattern following a concavo-convex pattern of an underlying layer.

As employed herein, "the bottom surface of the concave portion" shall refer to the upper surface of a layer that is in contact with the lower surface of the filler portion filling the concave portion between the recording elements. For example, if the concave portion is formed halfway between the upper surface and the lower surface of the recording layer so that the recording layer exists even under the concave portion, then the bottom surface of the concave portion refers to the upper surface of the recording layer lying in the concave portion between the recording elements. If the concave portion is formed to reach the seed layer or soft magnetic layer which is arranged below the recording layer and no recording layer exists in the concave portion, the bottom surface of the concave portion refers to the upper surface of the seed layer and/or soft magnetic layer that is in contact with the lower surface of the filler portion filling the concave portion. If the recording layer partly exists in the concave portion between the recording elements, the bottom surface of the concave portion refers to the upper surface of the recording layer and that of the seed layer and/or soft magnetic layer that are in contact with the lower surface of the filler portion filling the concave portion. If the filler portion is composed of a plurality of layers or elements, "the bottom surface of the concave portion" shall refer to the upper surface of a layer that is in contact with the lower surface of the layer of the filler portion lying closest to the substrate or the part of the filler portion lying closest to the substrate.

As employed herein, "the edge parts of the bottom surface of the concave portion" shall refer to the areas of the bottom surface of the concave portion, which lies along the boundaries between the recording elements and the concave portion.

As employed herein, "the lower surface of the recording layer" shall refer to the surface of the recording layer on the substrate side. The same holds for "the lower surface of the underlayer" and "the lower surface of the filler portion."

As employed herein, the term "magnetic recording medium" shall not be limited to hard disks, FLOPPY (Registered Trade Mark) disks, magnetic tapes, and the like where information is recorded and reproduced only through the use of magnetism. It shall also refer to MO (Magneto Optical) and other optical recording media that use magnetism and light in combination, and heat assisted recording media that use magnetism and heat in combination.

Advantageous Effects of Invention

According to various exemplary embodiments of the present invention, it is possible to provide a magnetic recording medium in which recording elements and concave portions have a clear difference in terms of magnetism at the boundaries therebetween and which has favorable production efficiency, and a magnetic recording and reproducing apparatus including the magnetic recording medium.

DESCRIPTION OF EMBODIMENTS

Hereinafter, preferred exemplary embodiments of the present invention will be described in detail with reference to the drawings.

Figure 1:
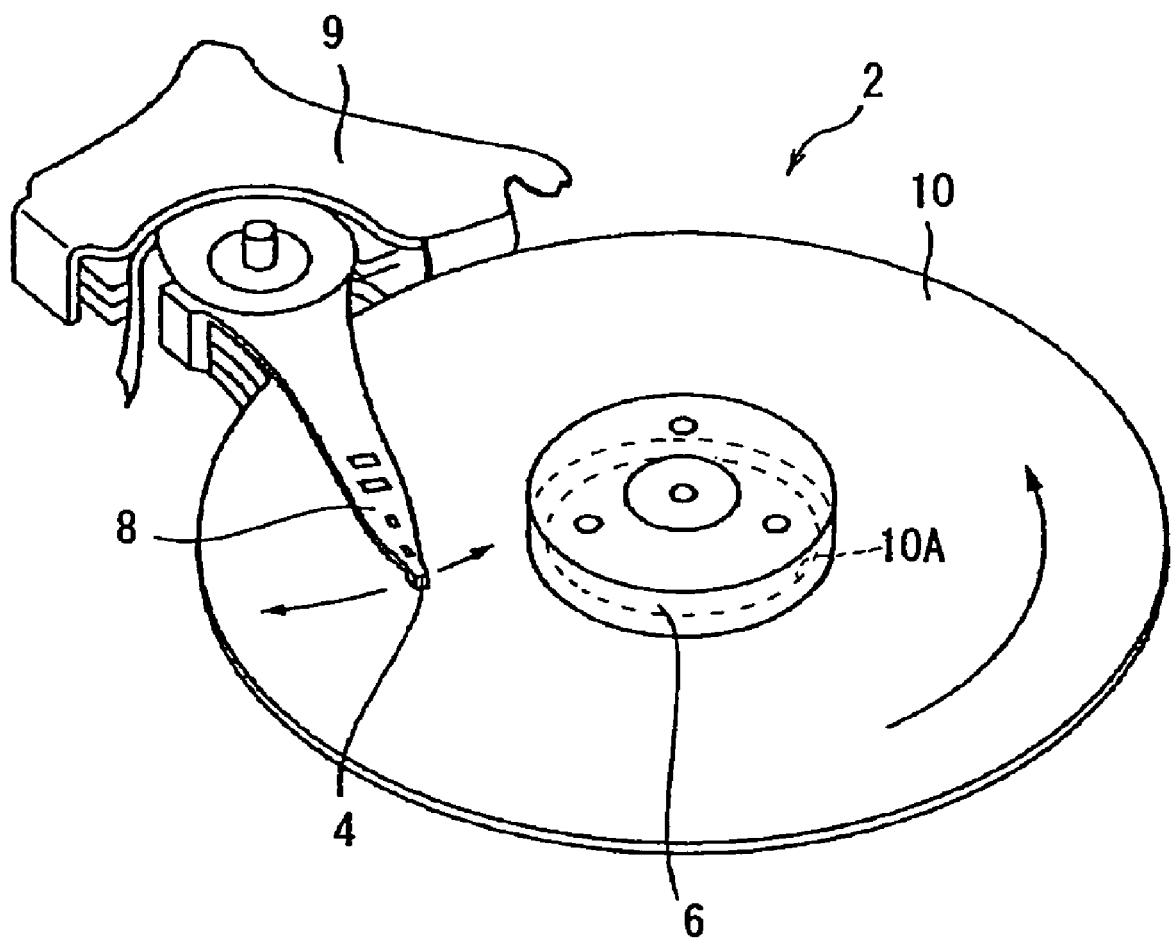
FIG. 1 is a perspective view schematically showing the general structure of a magnetic recording and reproducing apparatus according to a first exemplary embodiment of the present invention.

FIG. 1 shows a magnetic recording and reproducing apparatus 2 according to a first exemplary embodiment of the present invention. The magnetic recording and reproducing apparatus 2 includes a magnetic recording medium 10 and a magnetic head 4. The magnetic head 4 is arranged so that it can fly near the surface of the magnetic recording medium 10 in order to record and reproduce a magnetic signal on/from the magnetic recording medium 10.

The magnetic recording medium 10 has a center hole 10A. The magnetic recording medium 10 is fixed to a chuck 6 at the center hole 10A so that it can rotate with the chuck 6. The magnetic head 4 is mounted near the top of an arm 8. The arm 8 is rotatably attached to a base 9. The magnetic head 4 can thus move near the surface of the magnetic recording medium 10 in an arc orbit along a radial direction of the magnetic recording medium 10.

Figure 2:
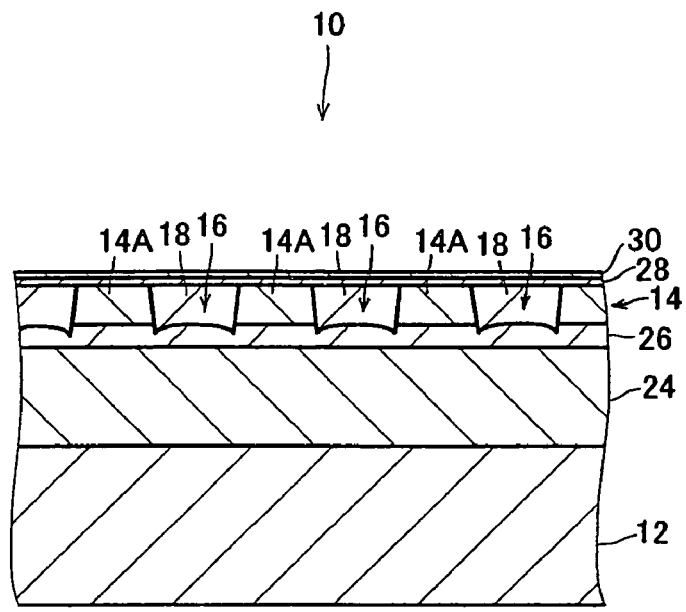
FIG. 2 is a sectional side view schematically showing the structure of a magnetic recording medium that is incorporated in the magnetic recording and reproducing apparatus.
Figure 3:
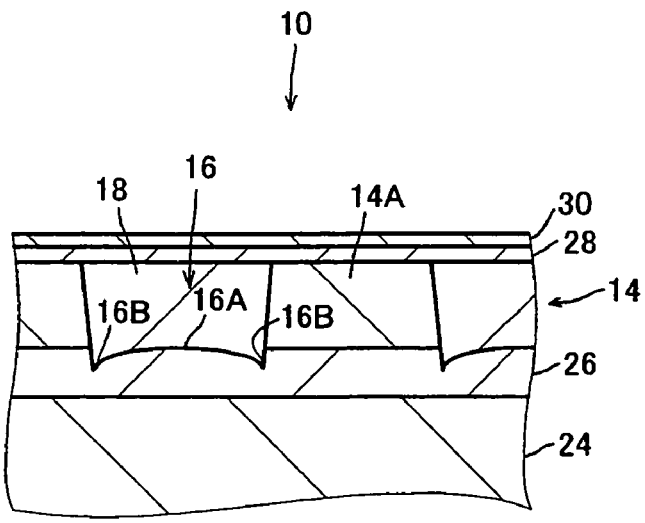
FIG. 3 is an enlarged sectional side view showing the structure of a concave portion in the magnetic recording medium.

The magnetic recording medium 10 is a discrete track medium of perpendicular recording type. As shown in FIGS. 2 and 3, the magnetic recording medium 10 has a substrate 12, a recording layer 14, and filler portions 18. The recording layer 14 is formed in a predetermined concavo-convex pattern over the substrate 12 so that the convex portions of the concavo-convex pattern serve as recording elements 14A. The filler portions 18 fill concave portions 16 between the recording elements 14A. The center part 16A of the bottom surfaces of the concave portions 16 protrude from the edge parts 16B of the bottom surfaces of the concave portions 16 in a direction away from the substrate 12. The rest of the configuration is not essential to the understanding of this first exemplary embodiment. A description thereof will thus be omitted as appropriate.

The magnetic recording medium 10 includes a soft magnetic layer 24, a seed layer (underlayer) 26, the recording layer 14, a protective layer 28, and a lubricant layer 30, which are formed in this order over the substrate 12.

The substrate 12 has a generally disk-like shape with a center hole. The substrate 12 may be made of materials such as glass, Al, and $Al_2O_3$.

The recording layer 14 has a thickness of 5 to 30 nm. The recording layer 14 may be made of materials including a CoPt-based alloy such as a CoCrPt alloy, an FePt-based alloy, a stacked layer of these, and material comprising oxide-based matrix material such as $SiO_2$ and ferromagnetic particles such as CoCrPt contained in the oxide-based matrix material. In a data region, the convex portions of the recording layer 14, i.e., the recording elements 14A are formed as a large number of concentric arcs that are radially separated by microscopic intervals. FIGS. 2 and 3 show such a configuration. In the data region, the recording elements 14A have a radial width of 10 to 100 nm at the upper surface height. The concave portions 16 have a radial width of 10 to 100 nm at the same height as the upper surfaces of the recording elements 14A. In a servo region, the recording elements 14A are formed in a predetermined servo pattern (not shown). In the first exemplary embodiment, the recording layer 14 is only formed as the recording elements 14A which are the convex portions of the concavo-convex pattern. No recording layer 14 is formed in the concave portions 16. That is, the lower surface of the recording layer 14 is divided by the concave portions 16.

The filler portions 18 may be made of materials including oxides such as $SiO_2$, $Al_2O_3$, $TiO_2$, MgO, $ZrO_2$, and ferrites, nitrides such as AlN, carbides such as SiC, Si, C (carbon), diamond-like carbon (DLC), non-magnetic metals such as Cu and Cr, and resin materials. In the first exemplary embodiment, the upper surfaces of the filler portions 18 (in the center parts) and those of the recording elements 14A are almost at the same level.

The soft magnetic layer 24 has a thickness of 50 to 300 nm. The soft magnetic layer 24 may be made of materials such as an Fe alloy and a Co alloy.

The seed layer 26 has a thickness of 2 to 40 nm. The seed layer 26 may be made of materials such as a nonmagnetic CoCr alloy, Ti, Ru, a stacked layer of Ru and Ta, and MgO.

The seed layer 26 serves as an underlayer that is in contact with the lower surface of the recording layer 14. In the first exemplary embodiment, the concave portions 16 are formed to reach the seed layer 26. In the concave portions 16, the seed layer 26 is exposed from the recording layer 14 and makes contact with the lower surfaces of the filler portions 18. According to the first exemplary embodiment, the bottom surfaces of the concave portions 16 thus refer to the upper surface of the seed layer 26 at the areas corresponding to the concave portions 16. The bottom surfaces of the concave portions 16 have an arcuate cross section protruding in the direction away from the substrate 12. The seed layer 26 has a continuous lower surface which is not divided by the concave portions 16. The seed layer 26 has almost the same thickness under the recording elements 14A and under the center parts of the concave portions 16.

The protective layer 28 has a thickness of 1 to 5 nm. The protective layer 28 may be made of DLC (Diamond-Like Carbon).

The lubricant layer 30 has a thickness of 1 to 2 nm. The lubricant layer 30 may be made of perfluoropolyether (PFPE).

Now, the operation of the magnetic recording medium 10 will be described.

In the magnetic recording medium 10, the center parts 16A of the bottom surfaces of the concave portions 16 protrude from the edge parts 16B of the bottom surfaces in the direction away from the substrate 12. As will be described later, in the step of filling the concave portions 16 with a filler material, a difference in the height of the upper surface of the filler material filling the concave portions 16 between over the center parts 16A of the concave portions 16 and over the edge parts 16B of the concave portions 16 can thus be suppressed to be smaller. This facilitates flattening.

In the magnetic recording medium 10, the edge parts 16B of the bottom surfaces of the concave portions 16 are formed closer to the substrate 12 than the center parts 16A of the bottom surfaces are. This clarifies the magnetic difference between the convex portions of the recording layer 14, i.e., the recording elements 14A and the concave portions 16 at their boundaries.

For example, in the first exemplary embodiment, the recording layer 14 is only formed as the recording elements 14A which are the convex portions of the concavo-convex pattern. No recording layer 14 is formed in the concave portions 16. Due to manufacturing variations, however, some of the recording layer 14 may be left on the bottom surfaces of the concave portions 16. Even if some of the recording layer 14 is thus left on the bottom surfaces of the concave portions 16, the recording layer 14 remains in the center parts 16A of the bottom surfaces of the concave portions 16 and not at the edge parts 16B of the bottom surfaces of the concave portions 16. This clarifies the magnetic difference between the recording elements 14A and the concave portions 16 at their boundaries.

Figure 4:
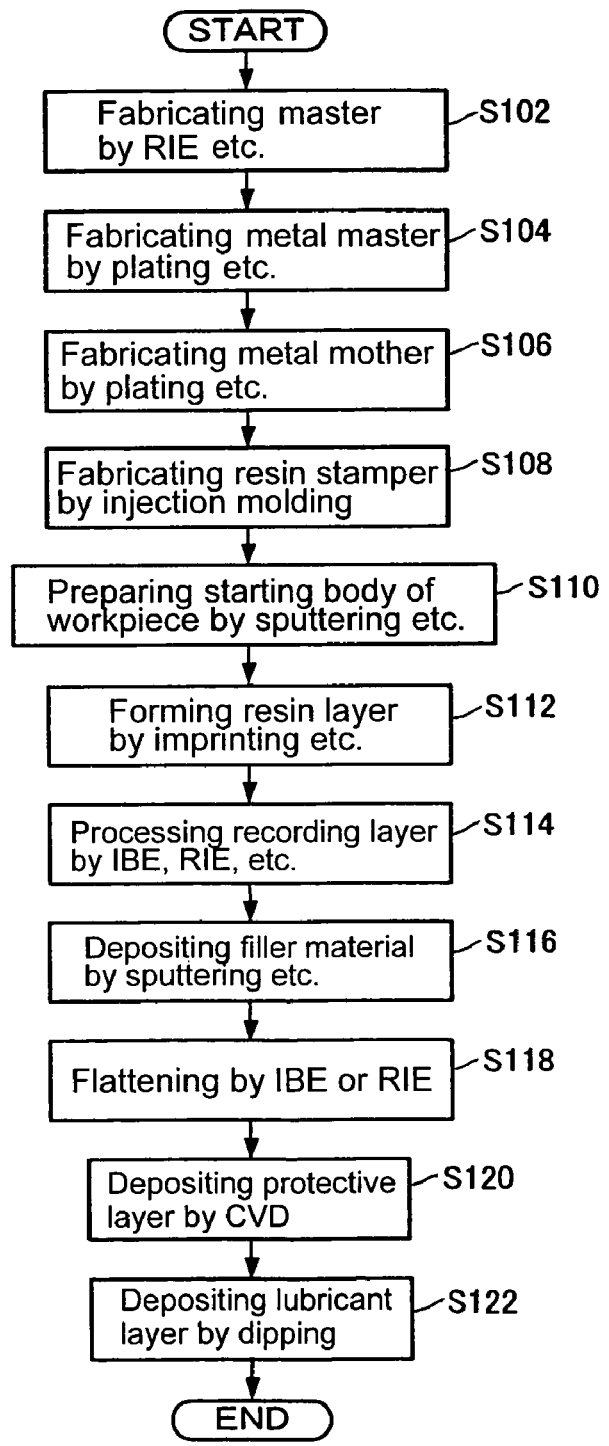
FIG. 4 is a flowchart outlining the steps of manufacturing the magnetic recording medium.

Next, the method of manufacturing the magnetic recording medium 10 will be described with reference to a flowchart shown in FIG. 4.

Figure 5:
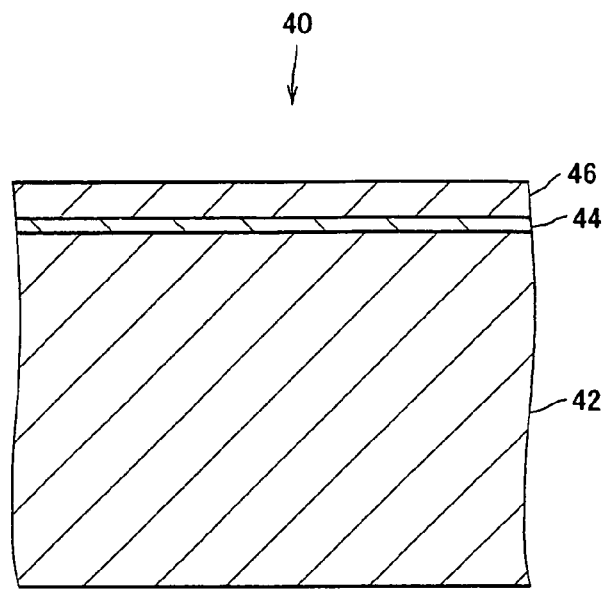
FIG. 5 is a sectional side view schematically showing the structure of a starting body of a workpiece for fabricating a master in the manufacturing steps.
Figure 6:
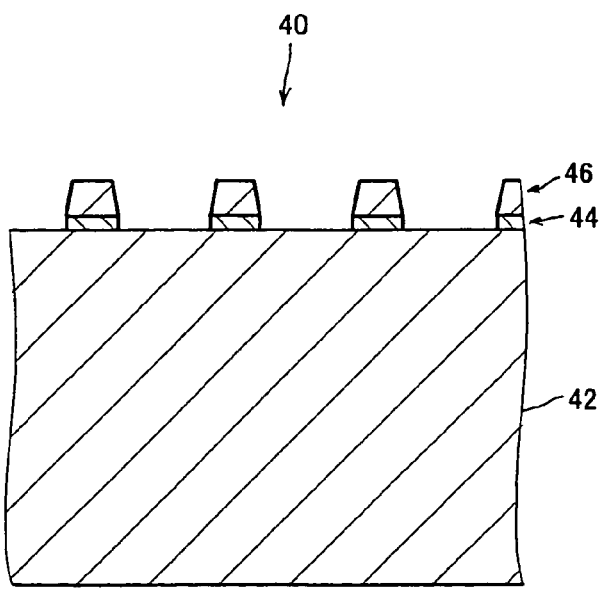
FIG. 6 is a sectional side view schematically showing the configuration of the workpiece with a resist layer and a mask layer processed in a concavo-convex pattern.
Figure 7:
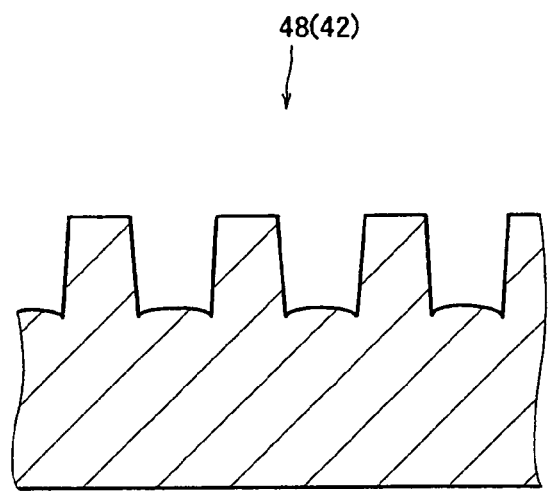
FIG. 7 is a sectional side view schematically showing the configuration of the master which is obtained by processing the workpiece.
Figure 8:
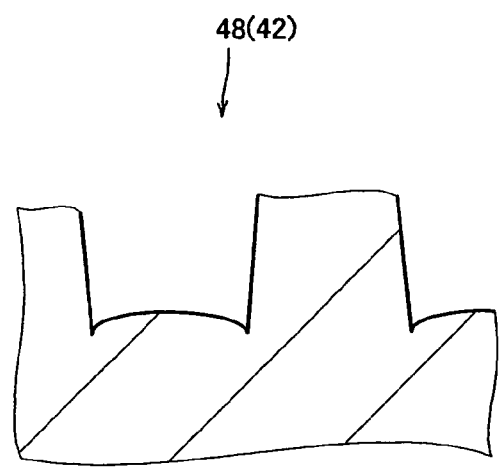
FIG. 8 is an enlarged sectional side view showing the structure of a concave portion in the master.

Initially, a master having a concavo-convex pattern corresponding to that of the recording layer 14 is fabricated (S102: master fabricating step). Specifically, a starting body of a workpiece 40 is prepared as shown in FIG. 5. The starting body of the workpiece 40 includes a substrate 42, a mask layer 44, and a resist layer 46, which are stacked in this order. The substrate 42 has a thickness of 0.6 to 3 mm, for example. The substrate 42 may be made of materials such as Si, $SiO_2$, and glassy carbon. The mask layer 44 has a thickness of 2 to 10 nm, for example. The mask layer 44 may be made of materials such as Ni, Cr, and Ti. The resist layer 46 has a thickness of 50 to 100 nm, for example. The resist layer 46 may be made of a photoresist such as an electron resist and an X-ray resist. The resist layer 46 is processed into a concavo-convex pattern corresponding to that of the recording layer 14 by exposure and development. Based on the resist layer 46 of concavo-convex pattern, the mask layer 44 is etched by IBE (Ion Beam Etching) or RIE (Reactive Ion Etching) using Ar gas, for example. Consequently, as shown in FIG. 6, the mask layer 44 is also processed into a concavo-convex pattern corresponding to that of the recording layer 14. As employed herein, the term "IBE" shall refer collectively to processing methods of irradiating a workpiece with an ionized gas to remove the target, such as ion milling. As employed herein, the term "RIE" shall be used as long as etching is performed in an RIE system even when using a gas that will not chemically react with an object to be processed, such as a noble gas. Next, the resist layer 46 remaining on the mask layer 44 is removed by RIE using $O_2$ gas, for example. Based on the mask layer 44 of concavo-convex pattern, the substrate 42 is further etched by RIE using halogen gas such as $CF_4$, or a mixed gas of halogen gas and $O_2$ gas. The etching is stopped halfway in the thickness direction of the substrate 42 so that the concavo-convex pattern formed in the substrate 42 has a difference of 30 to 60 nm in level. The substrate 42 is thus processed into a concavo-convex pattern corresponding to that of the recording layer 14. Here, the etching condition is adjusted to form the concave portions in the substrate 42 so that the center parts of the bottom surfaces of the concave portions protrude from the edge parts of the bottom surfaces as shown in FIGS. 7 and 8. For example, a chamber pressure higher than a typical setting (for instance, around 1 Pa or higher) can be employed to form the concave portions in the substrate 42 so that the center parts of the bottom surfaces protrude from the edge parts of the bottom surfaces. A possible reason why the concave portions are formed in the substrate 42 so that the center parts of the bottom surfaces protrude from the edge parts of the bottom surfaces is as follows: Higher chamber pressures can suppress the mean free path of the processing gas and deteriorate the rectilinearity of the processing gas, with a tendency to taper the side surfaces of the concave portions. Some of the processing gas impinges on the side surfaces of the concave portions and concentrates into the edge parts of the bottom surfaces of the concave portions, making the amount of etching in the edge parts of the bottom surfaces of the concave portions higher than in the center parts of the bottom surfaces of the concave portions. For such etching, the etching condition is typically set so as to make the bottom surfaces of the concave portions become flat. The foregoing typical pressure refers to the chamber pressure in such a situation. Now, the workpiece 40 is immersed in an acid solution such as amidosulfuric acid to remove the mask layer 44 remaining on the convex portions of the substrate 42, whereby a master 48 is obtained as shown in FIGS. 7 and 8.

Next, a metal master is fabricated (S104: metal master fabricating step). Specifically, a conductive film of Ni is deposited over the surface of the concavo-convex pattern of the master 48 by vapor deposition, sputtering, chemical plating, or the like. An electrolytic plating layer of Ni is further formed over the conductive film by electrolytic plating. The conductive film and the electrolytic plating layer are integrally released from the master 48 to obtain a metal master (not shown). The metal master has a concavo-convex pattern in reverse configuration to that of the master 48.

Next, a metal mother is fabricated (S106: metal mother fabricating step). Specifically, an electrolytic plating layer of Ni is formed over the surface of the concavo-convex pattern of the metal master by electrolytic plating. The electrolytic plating layer is released from the metal master, and die-cut into a predetermined size. The resultant is polished on the backside opposite from the side having the concavo-convex pattern, whereby a metal mother (not shown) is obtained. The metal mother has a concavo-convex pattern in the same configuration as that of the master 48. It should be noted that a metal stamper (not shown) having a concavo-convex pattern of the same configuration as that of the master 48 may be fabricated from the metal mother by repeating the transfer with electrolytic plating twice, four times, or an even number of times more.

Figure 9:
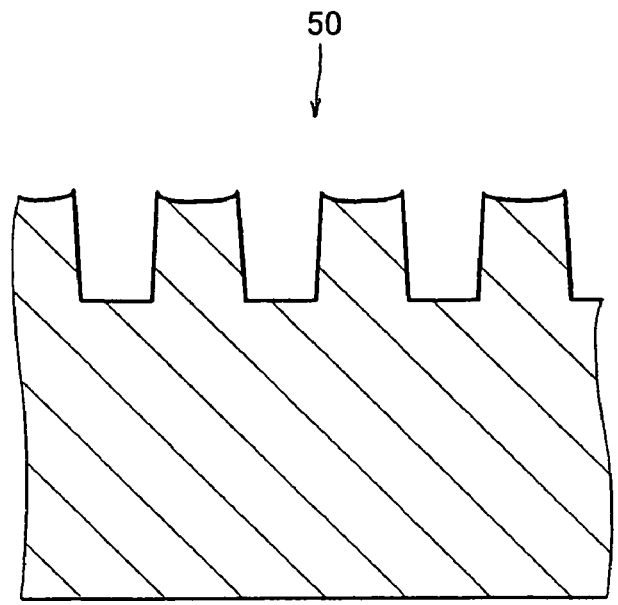
FIG. 9 is a sectional side view schematically showing the configuration of a resin stamper that is obtained based on the master.

Next, a resin stamper is fabricated (S108: resin stamper fabricating step). Specifically, the metal mother or the metal stamper having a concavo-convex pattern of the same configuration as that of the master 48 is set in a mold, and a resin stamper 50 such as shown in FIG. 9 is fabricated by injection molding. The resin stamper 50 has a concavo-convex pattern in reverse configuration to that of the master 48. The convex portions of the resin stamper 50 are therefore configured such that the center parts of the upper surfaces are recessed below the edge parts. The resin stamper 50 has a light transmittance capable of transmitting ultraviolet rays and/or visible light.

Figure 10:
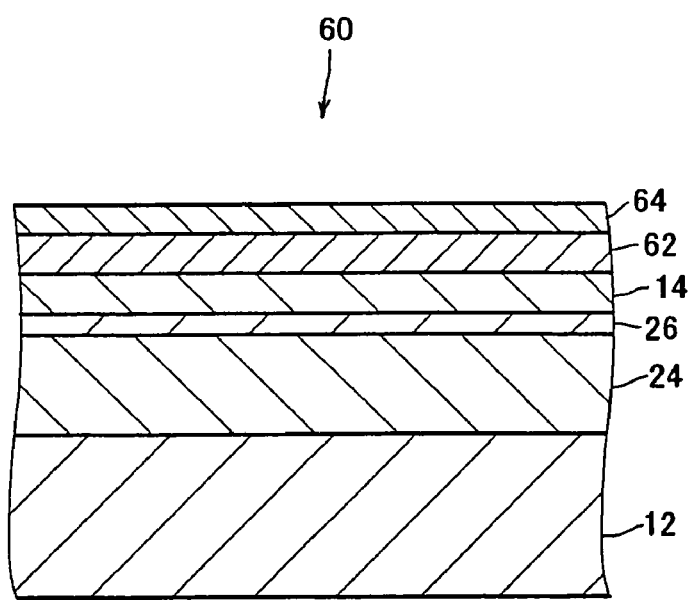
FIG. 10 is a sectional side view schematically showing the structure of a starting body of a workpiece for fabricating a magnetic recording medium in the manufacturing steps.

Next, a starting body of a workpiece 60 such as shown in FIG. 10 is prepared (S110: workpiece starting body preparing step). The starting body of the workpiece 60 is obtained by depositing a soft magnetic layer 24, a seed layer 26, the recording layer 14 (a continuous film before being processed into the concavo-convex pattern), a first mask layer 62, and a second mask layer 64 over a substrate 12 in this order by sputtering and the like method.

The first mask layer 62 has a thickness of 3 to 50 nm. The first mask layer 62 may be made of a material that consists primarily of C (carbon), like DLC. The second mask layer 64 has a thickness of 3 to 30 nm. The second mask layer 64 may be made of Ni or the like.

Figure 11:
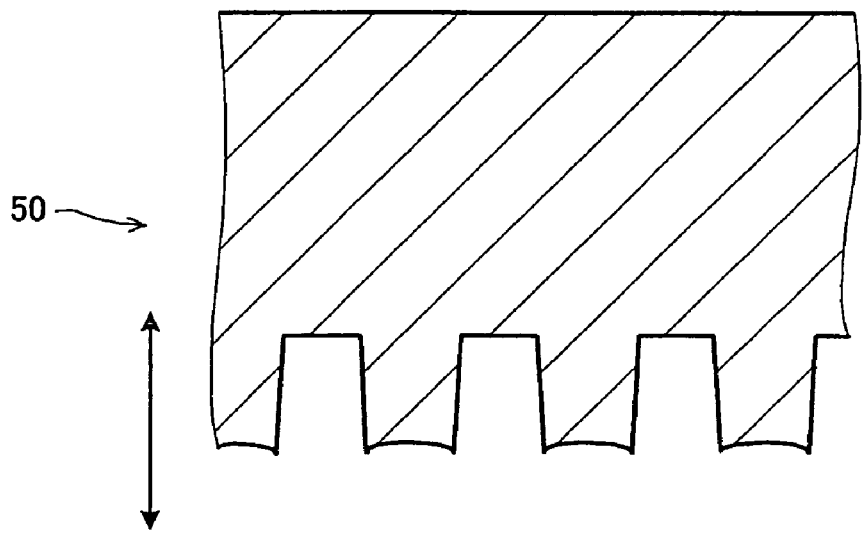
FIG. 11 is a sectional side view schematically showing the configuration of the workpiece with a resin layer of concavo-convex pattern formed by using the resin stamper.
Figure 11:
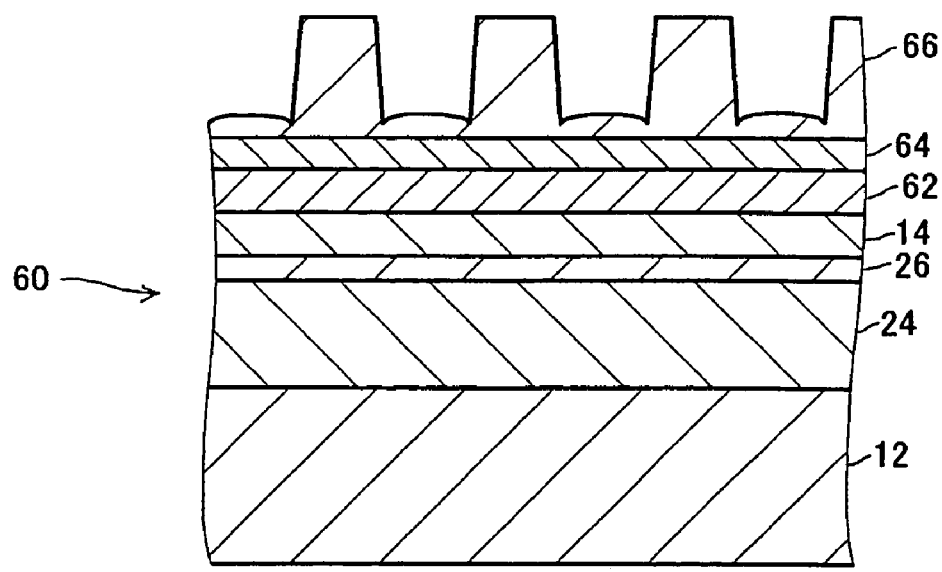

Next, as shown in FIG. 11, a resin layer 66 is formed over the second mask layer 64 of the workpiece 60 (S112: resin layer forming step). Specifically, a resin material is applied to the second mask layer 64 of the workpiece 60 by spin coating. A concavo-convex pattern corresponding to that of the recording layer 14 is then transferred to the resin material by imprinting using the resin stamper 50. The imprinting methods available include optical imprinting using ultraviolet rays or the like, and thermal imprinting. For optical imprinting, the resin layer 66 may be made of materials such as an ultraviolet curable resin. In the optical imprinting, the resin material is irradiated with ultraviolet rays and/or visible light through the resin stamper 50 for curing. For thermal imprinting, the resin layer 66 may be made of materials such as a thermoplastic resin. In the thermal imprinting, the metal stamper may be used as the imprinting stamper. The resin layer 66 has a thickness (the thickness of the convex portions) of 10 to 300 nm, for example. The concave portions formed in the resin layer 66 are shaped so that the center parts of the bottom surfaces protrude from the edge parts of the bottom surfaces.

Figure 12:
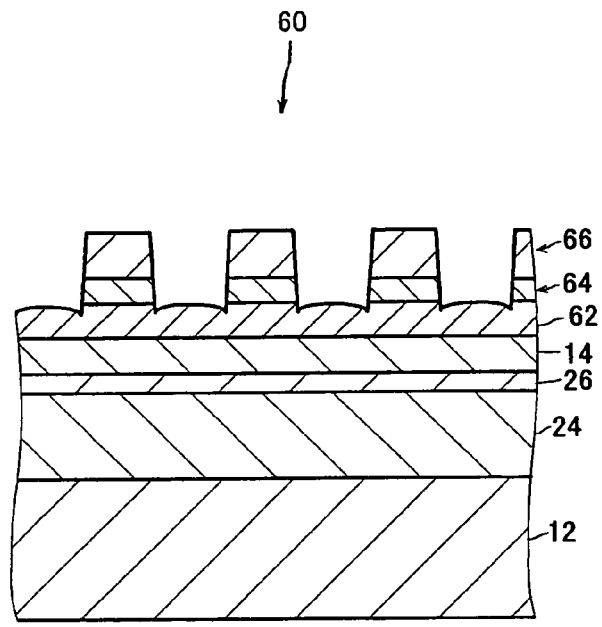
FIG. 12 is a sectional side view schematically showing the configuration of the workpiece with the resin layer and a second mask layer processed in a concavo-convex pattern.
Figure 13:
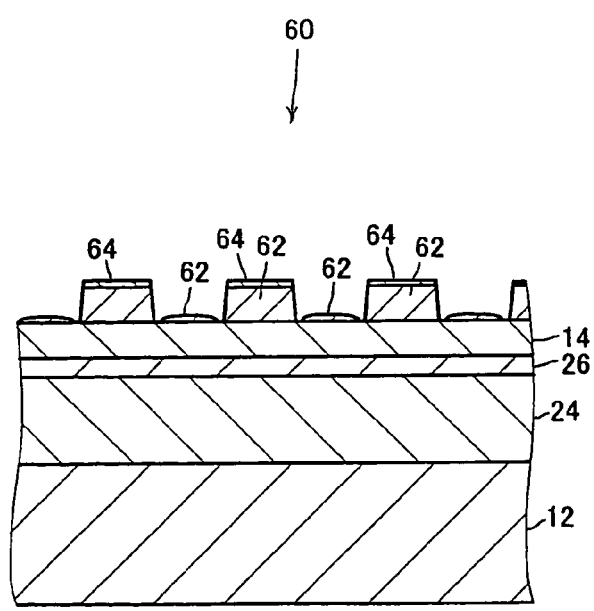
FIG. 13 is a sectional side view schematically showing the configuration of the workpiece with a first mask layer processed in a concavo-convex pattern.
Figure 14:
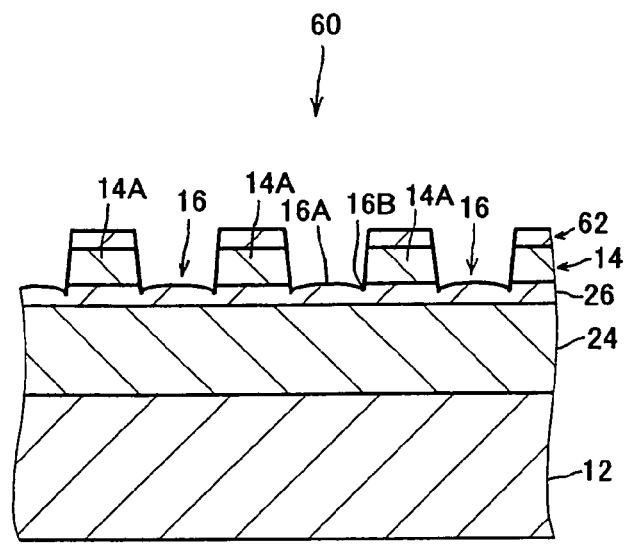
FIG. 14 is a sectional side view schematically showing the configuration of the workpiece with a recording layer processed in a concavo-convex pattern.

Next, the recording layer 14 is processed into the concavo-convex pattern based on the resin layer 66 of the concavo-convex pattern (S114: recording layer processing step). Specifically, the resin layer 66 and the second mask layer 64 are removed from the bottoms of the concave portions by IBE or RIE using a noble gas such as Ar gas. The etching is stopped when the first mask layer 62 is exposed in the concave portions. As shown in FIG. 12, the upper surfaces of the first mask layer 62 in the concave portions are shaped so that the center parts protrude from the edge parts. At this point in time, the resin layer 66 and the second mask layer 64 still remain at the convex portions. Next, the first mask layer 62 is etched by IBE or RIE using $O_2$ gas, based on the resin layer 66 and the second mask layer 64 of the convex portions. The etching of the first mask layer 62 is stopped when the etching reaches the upper surface of the recording layer 14 in the edge parts of the concave portions as shown in FIG. 13. At this point in time, the resin layer 66 is completely eliminated from the convex portions. The second mask layer 64 is left on the convex portions in part in the thickness direction. The first mask layer 62 also remains on the bottoms of the concave portions. At the edge parts of the bottoms of the concave portions, the first mask layer 62 has almost disappeared. The upper surfaces of the first mask layer 62 in the concave portions are shaped so that the center parts protrude from the edge parts. Next, the recording layer 14 is etched by IBE or RIE using a noble gas such as Ar gas, based on the first mask layer 62. The upper surfaces of the first mask layer 62 in the concave portions (the bottom surfaces of the concave portions) are shaped so that the center parts protrude from the edge parts of the upper surfaces, and the first mask layer 62 has almost disappeared from the edge parts of the bottom surfaces of the concave portions. The recording layer 14 therefore starts being etched in the edge parts of the bottom surfaces of the concave portions before in the other areas of the bottom surfaces of the concave portions. The etching of the recording layer 14 is stopped when the recording layer 14 is removed from the concave portions and the seed layer 26 is almost completely exposed from the recording layer 14 in the concave portions. This divides the recording layer 14 into a large number of recording elements 14A as shown in FIG. 14. At this point in time, the second mask layer 64 on the recording elements 14A completely disappears but the first mask layer 62 remains. The upper surfaces of the seed layer 26 in the concave portions 16 between the recording elements 14A (the bottom surfaces of the concave portions) are shaped so that the center parts 16A protrude from the edge parts 16B. The upper surfaces of the seed layer 26 in the center parts of the concave portions 16 are preferably at the same level as the lower surfaces of the recording elements 14A. In other words, the seed layer (underlayer) 26 preferably has almost the same thickness both under the recording elements 14A and in the center parts of the concave portions 16. Suppose that some of the recording layer 14 remains on the bottom surfaces of the concave portions 16 when the concave portions 16 are formed so that the upper surfaces of the seed layer 26 in the center parts of the concave portions 16 are at the same level as the bottom surfaces of the recording elements 14A. Even in such a case, the remaining recording layer 14 lies in the center parts 16A of the bottom surfaces of the concave portions 16 and not at the edge parts 16B of the bottom surfaces of the concave portions 16. This clarifies the magnetic difference between the recording elements 14A and the concave portions 16 at their boundaries.

Figure 15:
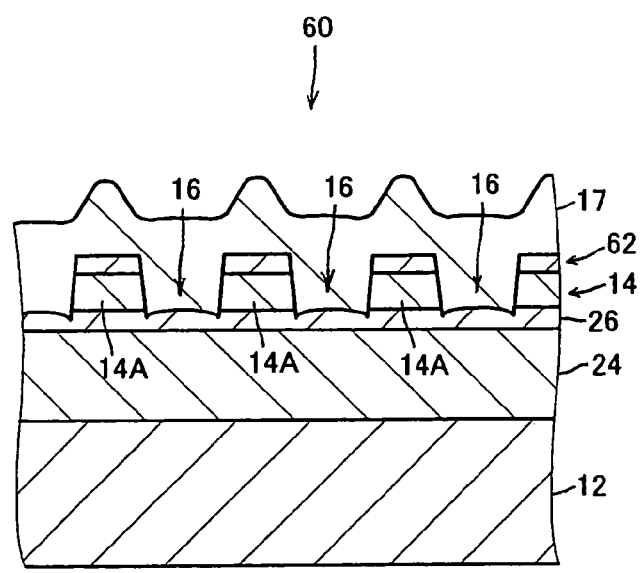
FIG. 15 is a sectional side view schematically showing the configuration of the workpiece with a filler material deposited on the recording layer.

Next, as shown in FIG. 15, a filler material 17 such as $SiO_2$ is deposited over the workpiece 60, which has the recording layer 14 of the concavo-convex pattern, by using a vacuum deposition method such as sputtering, vapor deposition, or vapor phase epitaxy. The filler portions 18 which are made of the filler material 17 and fill the concave portions 16 are thereby formed in the concave portions 16 between the recording elements 14A (S116: filler material depositing step). The filler material 17 is also deposited over the first mask layer 62 on the recording elements 14A so as to cover the recording layer 14 and the first mask layer 62 following the concavo-convex pattern of the recording layer 14. In the concave portions 16, the center parts 16A of the bottom surfaces of the concave portions 16 protrude from the edge parts 16B of the bottom surfaces in the direction away from the substrate 12. The difference in the height of the upper surface of the deposited filler material 17 between over the edge parts 16B of the bottom surfaces of the concave portions 16 and over the center parts 16A of the bottoms surface of the concave portions 16 is thus suppressed to be smaller than when the concave portions 16 have a flat bottom surface. To suppress the difference in level between the concavities and convexities on the surface of the filler material 17, the filler material 17 is preferably deposited with a bias voltage applied to the workpiece.

Figure 16:
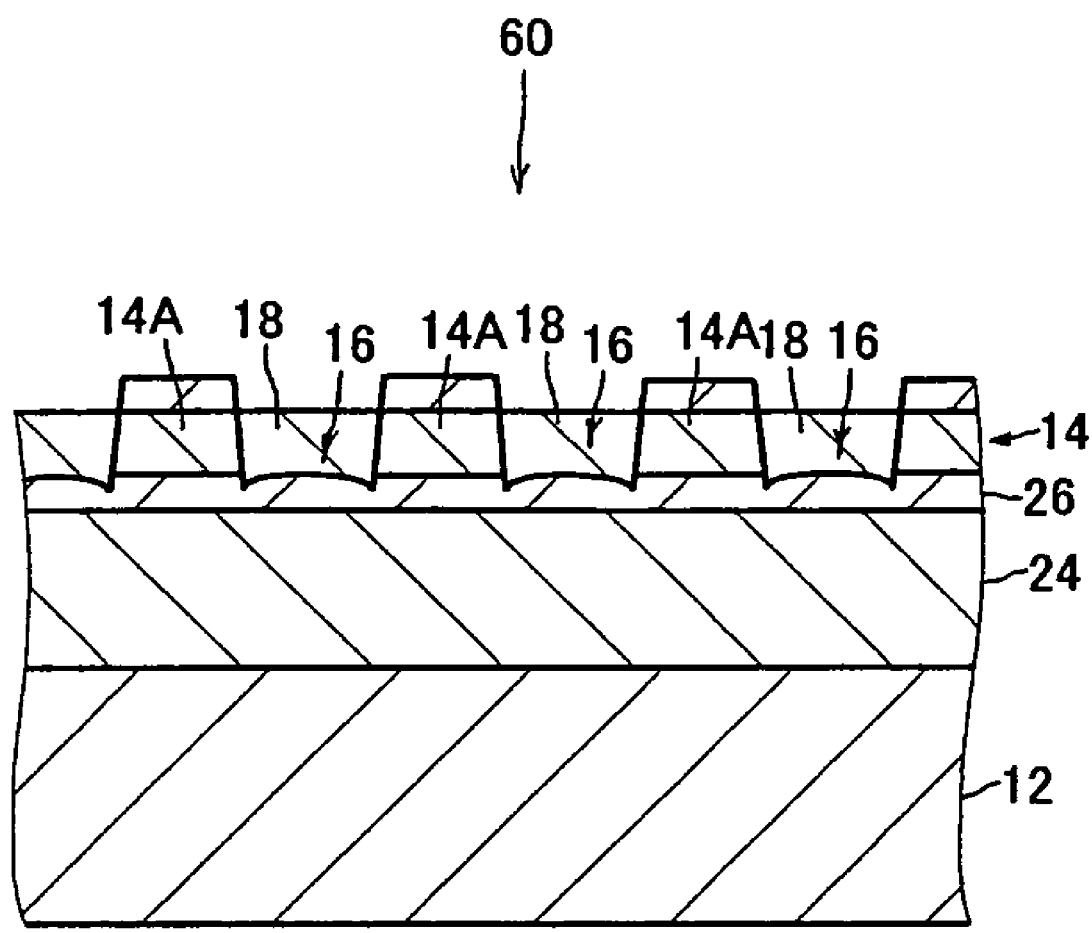
FIG. 16 is a sectional side view schematically showing the configuration of the workpiece with an excess of the filler material removed.

Next, as shown in FIG. 16, an excess of the filler material 17 is removed by IBE or RIE using a noble gas such as Ar gas, whereby the upper surfaces of the recording elements 14A and the upper surfaces of the filler portions 18 are flattened (S118: flattening step). As employed in the first exemplary embodiment, the "excess of the filler material 17" shall refer to the portion of the filler material 17 lying above the upper level of the recording layer 14 (on the side opposite from the substrate 12). Dry etching tends to remove convex portions selectively faster than concave portions. In particular, IBE and RIE have a strong tendency to remove convex portions selectively faster than concave portions. The filler material 17 over the recording elements 14A can thus be removed with high efficiency. At this step, the angle of irradiation of the processing gas is set to 90° with respect to the surface of the workpiece 60, for example. As employed herein, "the angle of irradiation of the processing gas" shall refer to the angle that is formed between the main direction of travel of the processing gas and the surface of the workpiece. For example, the angle of irradiation is 0° if the main direction of travel of the processing gas is parallel to the surface of the workpiece. The angle of irradiation is 90° if the main direction of travel of the processing gas is perpendicular to the surface of the workpiece. Greater angles of irradiation of the processing gas provide higher etching rates, which contribute to improved production efficiency. RIE is lower than IBE in the rectilinearity of the processing gas. Even when the angle of irradiation of the RIE processing gas is set to 90°, i.e., to be perpendicular to the surface of the workpiece 60, some of the particles impinge on the workpiece 60 in directions oblique to the surface of the workpiece 60. This facilitates etching convex portions faster than concave portions, so that the first mask layer 62 over the recording elements 14A can be easily exposed from the filler material 17. Note that the angle of irradiation of the processing gas may be set to a smaller angle than 90°. Such a setting intensifies the tendency to remove convex portions faster than concave portions. The etching rate to the filler material deposited on the side surfaces of the first mask layer 62 becomes relatively higher, and the side surfaces of the first mask layer 62 are exposed more easily. The etching of the filler material 17 is stopped when the upper surfaces of the filler portions 18 filling the concave portions 16 come to the same level as the upper surfaces of the recording elements 14A. Next, the first mask layer 62 on the recording elements 14A are removed by IBE or RIE using $N_2$ gas, $NH_3$ gas, $O_2$ gas, or the like. The upper surfaces of the recording elements 14A and the upper surfaces of the filler portions 18 are thereby flattened. The surface of the workpiece 60 may be further etched by IBE using Ar gas for such purposes as removing an altered layer from the surfaces of the recording elements 14A.

Next, the protective layer 28 is formed over the recording elements 14A and the filler portions 18 by CVD (S120: protective layer depositing step). The lubricant layer 30 is further formed on the protective layer 28 by dipping (S122: lubricant layer depositing step). This completes the magnetic recording medium 10 shown in FIGS. 2 and 3 seen above.

Figure 17:
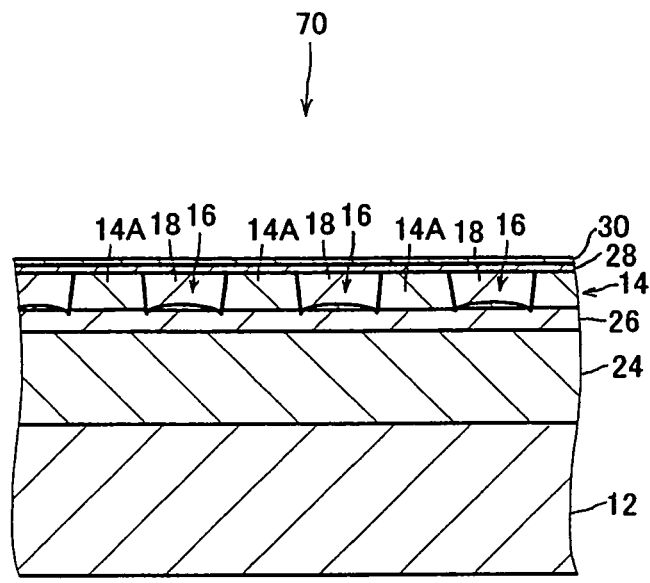
FIG. 17 is a sectional side view schematically showing the structure of a magnetic recording medium according to a second exemplary embodiment of the present invention.
Figure 18:
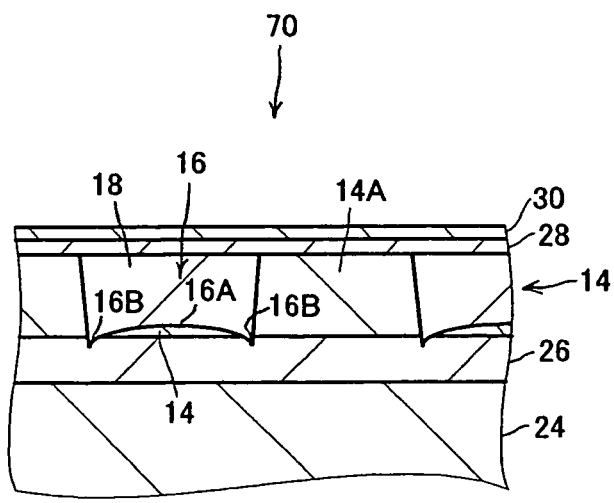
FIG. 18 is an enlarged sectional side view showing the structure of a concave portion in the magnetic recording medium.

Next, a second exemplary embodiment of the present invention will be described. In the magnetic recording medium 10 according to the foregoing first exemplary embodiment, the recording layer 14 is only formed as the recording elements 14A which are the convex portions of the concavo-convex pattern, and no recording layer 14 is formed in the concave portions 16. In contrast, as shown in FIGS. 17 and 18, a magnetic recording medium 70 according to this second exemplary embodiment has a recording layer 14 that is also formed in the concave portions 16 in part. More specifically, the recording layer 14 is formed in the center parts 16A of the bottom surfaces of the concave portions 16 and not at the edge parts 16B of the bottom surfaces of the concave portions 16. The rest of the configuration is the same as that of the magnetic recording medium 10 according to the foregoing first exemplary embodiment. Identical components will thus be designated by the same reference numerals as in FIGS. 1 to 16, and a description thereof will be omitted.

Even if the recording layer 14 is thus formed in the concave portions 16 in part, the recording layer 14 lies in the center parts 16A and not at the edge parts 16B of the bottom surfaces of the concave portions 16. This clarifies the magnetic difference between the recording elements 14A and the concave portions 16 at their boundaries. In the step of depositing the filler material 17 in the concave portions 16, it is again possible to suppress the difference in the height of the upper surface of the filler material 17 filling the concave portions 16 between over the center parts and over the edge parts of the concave portions 16. This facilitates flattening.

The magnetic recording medium 70 according to the second exemplary embodiment can be manufactured by performing the recording layer processing step (S114) so that the etching of the recording layer 14 based on the first mask layer 62 is stopped when the seed layer 26 is exposed only in the edge parts of the concave portions. Note that the recording layer 14 can sometimes remain on the edge parts of the bottom surfaces of the concave portions 16 due to etching variations and the like. Since such a recording layer 14 is thinner under the edge parts 16B than under the center parts 16A of the bottom surfaces of the concave portions 16, there is provided some effect to clarify the magnetic difference between the recording elements 14A and the concave portions 16 at their boundaries.

Figure 19:
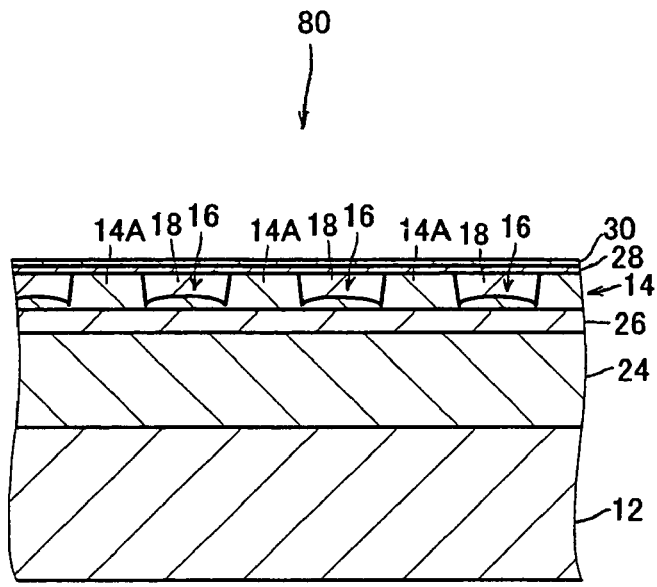
FIG. 19 is a sectional side view schematically showing the structure of a magnetic recording medium according to a third exemplary embodiment of the present invention.
Figure 20:
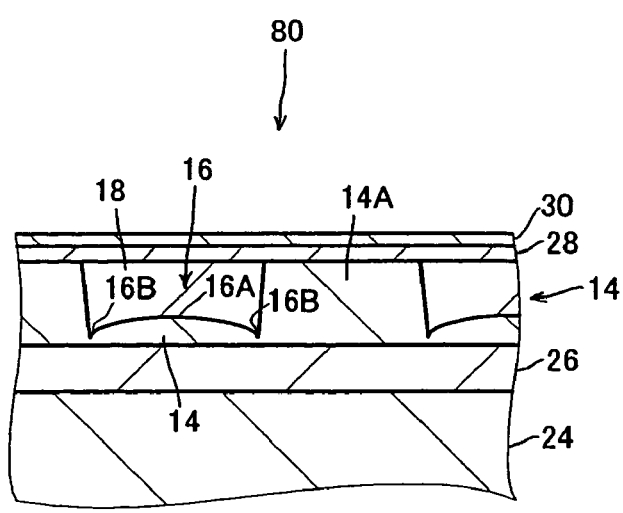
FIG. 20 is an enlarged sectional side view showing the structure of a concave portion in the magnetic recording medium.

Next, a third exemplary embodiment of the present invention will be described. In the magnetic recording medium 70 according to the foregoing second exemplary embodiment, the recording layer 14 is formed in the concave portions 16 in part. In contrast, as shown in FIGS. 19 and 20, a magnetic recording medium 80 according to this third exemplary embodiment has a recording layer 14 that is formed over the entire bottom surfaces of the concave portions 16 to have a continuous lower surface. Note that the recording layer 14 is thinner in the edge parts 16B of the bottoms of the concave portions 16 than in the center parts 16A of the bottoms. The rest of the configuration is the same as that of the magnetic recording media 10 and 70 according to the foregoing first and second exemplary embodiments. Identical components will thus be designated by the same reference numerals as in FIGS. 1 to 18, and a description thereof will be omitted.

Even if the recording layer 14 is thus formed over the entire bottom surfaces of the concave portions 16, the recording layer 14 is thinner under the edge parts 16B of the bottom surfaces of the concave portions 16 than under the center parts 16A of the bottom surfaces. This provides some effect to clarify the magnetic difference between the recording elements 14A and the concave portions 16 at their boundaries. Note that the portions of the recording layer 14 formed under the bottom surfaces of the concave portions 16 sometimes have no substantial impact on the magnetic characteristics of the magnetic recording medium 80. The recording layer 14 may be processed so that the portions of the recording layer 14 formed under the bottom surfaces of the concave portions 16 become close to nonmagnetic in property. For example, the bottom surfaces of the concave portions 16 may be subjected to a reactive gas to modify the recording layer of the bottom surfaces of the concave portions 16. Ion implantation may be performed on the bottom surfaces of the concave portions 16 to modify the recording layer of the bottom surfaces of the concave portions 16. Even in such cases, it is possible, in the step of depositing the filler material 17 in the concave portions 16, to suppress the difference in the height of the upper surface of the filler material 17 filling the concave portions 16 between over the center parts and over the edge parts of the concave portions 16. This provides the advantage of easy flattening.

The magnetic recording medium 80 according to the third exemplary embodiment can be manufactured by performing the recording layer processing step (S114) so that the etching of the recording layer 14 based on the first mask layer 62 is stopped before the seed layer 26 is exposed in the edge parts of the concave portions.

Figure 21:
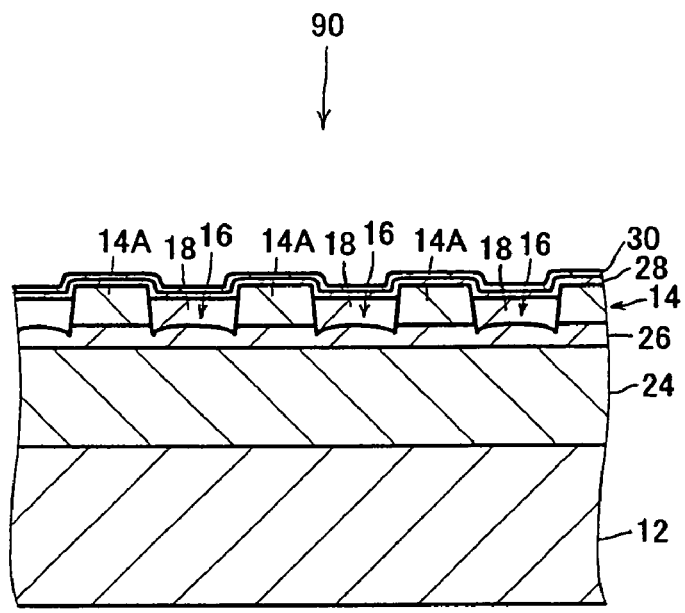
FIG. 21 is a sectional side view schematically showing the structure of a magnetic recording medium according to a fourth exemplary embodiment of the present invention.
Figure 22:
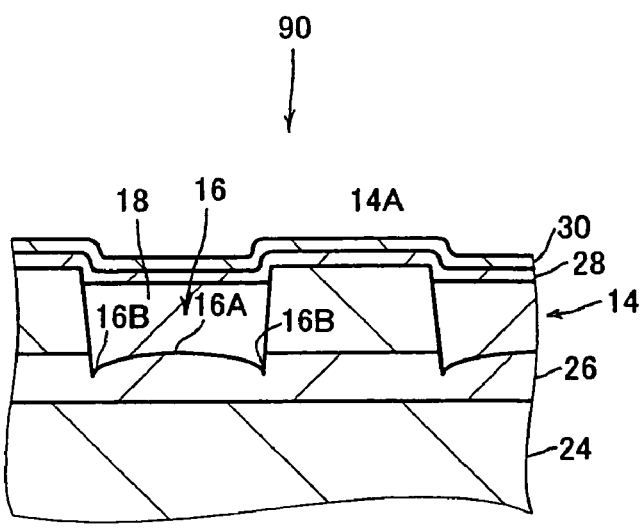
FIG. 22 is an enlarged sectional side view showing the structure of a concave portion in the magnetic recording medium.

Next, a fourth exemplary embodiment of the present invention will be described. In the magnetic recording media 10, 70, and 80 according to the foregoing first to third exemplary embodiments, the upper surfaces of the recording elements 14A and those of the filler portions 18 filling the concave portions 16 are almost at the same level. In contrast, as shown in FIGS. 21 and 22, a magnetic recording medium 90 according to this fourth exemplary embodiment is configured so that the upper surfaces of the filler portions 18 lie at a level lower than the upper surfaces of the recording elements 14A.

In order to stabilize the flying height of the magnetic head 4, the magnetic recording medium preferably has a flat surface. Depending on the conditions such as the speed of rotation, the track pitch size of the magnetic recording medium, the head slider and the like, however, the magnetic head 4 can sometimes provide a stable flying height even if the surfaces over the recording elements 14A and those over the concave portions 16 have some difference in level. In such a case, the upper surfaces of the filler portions 18 may be located at a level lower than those of the recording elements 14A as in this fourth exemplary embodiment. Note that FIGS. 21 and 22 show a configuration where the recording layer 14 does not exist in the concave portions 16 as in the foregoing first exemplary embodiment. Even if the recording layer 14 exists in the concave portions 16 as in the foregoing second and third exemplary embodiments, the upper surfaces of the filler portions 18 may still be located at a level lower than those of the recording elements 14A as long as the magnetic head 4 provides a stable flying height.

The magnetic recording medium 90 according to the fourth exemplary embodiment can be manufactured by performing the filler material depositing step (S116) so that the deposition of the filler material 17 is stopped before the concave portions 16 are completely filled with the filler material 17 (in a state where the upper surfaces of the filler material 17 deposited in the concave portions 16 are lower than the upper surfaces of the recording elements 14A). The magnetic recording medium 90 of the fourth exemplary embodiment can also be manufactured by performing the flattening step (S118) so that the etching of the filler material 17 is continued until the upper surfaces of the filler portions 18 filling the concave portions 16 fall below the upper surfaces of the recording elements 14A in level. These techniques may be used in combination to manufacture the magnetic recording medium 90 according to the fourth exemplary embodiment. When stopping the deposition of the filler material 17 before the concave portions 16 are completely filled with the filler material 17 (in a state where the upper surfaces of the filler material 17 deposited in the concave portions 16 are lower than the upper surfaces of the recording elements 14A), an excess of the filler material 17 above the recording elements 14A may be removed in the flattening step (S118), using a polishing method such as CMP.

Even if the upper surfaces of the filler portions 18 are lower than those of the recording elements 14A in level as in the fourth exemplary embodiment, the center parts 16A of the bottom surfaces of the concave portions 16 protrude from the edge parts 16B of the bottom surfaces in the direction away from the substrate 12. In the step of depositing the filler material 17 in the concave portions 16, it is therefore possible to suppress the difference in the height of the upper surface of the filler material 17 filling the concave portions 16 between over the center parts and over the edge parts of the concave portions 16. This facilitates flattening. A difference in height between the upper surfaces of the filler portions 18 over the edge parts of the concave portions 16 and those over the center parts of the concave portions 16 can thus be reduced sufficiently, so that the surface over the concave portions 16 have a near flat shape. Consequently, the air film between the magnetic head 14 and the magnetic recording medium 90 is improved in stiffness, with some effect to stabilize the flying height of the magnetic head.

In the foregoing first to fourth exemplary embodiments, the etching condition for etching the substrate 40 in the master fabricating step (S102), like a vacuum chamber pressure, is adjusted to fabricate a master 48 of such a shape that the center parts of the bottom surfaces of the concave portions protrude from the edge parts of the bottom surfaces. The magnetic recording media 10, 70, 80, and 90 having the configuration that the center parts 16A of the bottom surfaces of the concave portions 16 protrude from the edge parts of the bottom surfaces are manufactured based on the master 48. However, a master having concave portions with flat bottom surfaces may be fabricated instead. In such a case, when etching the recording layer 14 in the recording layer processing step (S114), the etching condition such as a vacuum chamber pressure is adjusted to manufacture the magnetic recording media 10, 70, 80, and 90 so that the center parts 16A of the bottom surfaces of the concave portions 16 protrude from the edge parts 16B of the bottom surfaces. The recording layer 14 may be etched by RIE using a mixed gas of CO gas and $NH_3$ gas, or a halogen gas.

In the foregoing first to fourth exemplary embodiments, the first mask layer 62, the second mask layer 64, and the resin layer 66 are formed over the continuous film of recording layer 14 and then the recording layer 14 is divided into the concavo-convex pattern through the three phases of dry etching. Nevertheless, the materials of the mask layers and the resin layer, the number of mask and/or resin layers to be stacked, the thicknesses of the layers, and the types of dry etching are not particularly limited as long as the recording layer 14 can be processed with a highly precise shape.

In the foregoing first to fourth exemplary embodiments, the soft magnetic layer 24 and the seed layer 26 are formed under the recording layer 14. Nevertheless, the configuration of the layers under the recording layer 14 may be modified as appropriate depending on the type of the magnetic recording medium. For example, an underlayer (not a seed layer) and an antiferromagnetic layer may be formed between the soft magnetic layer 24 and the substrate 12. Either one or both of the soft magnetic layer 24 and the seed layer 26 may be omitted. The recording layer may be formed directly over the substrate.

In the foregoing first to fourth exemplary embodiments, the magnetic recording media 10, 70, 80, and 90 are discrete track media of perpendicular recording type, in which the recording layer 14 is formed in a concavo-convex pattern corresponding to the configuration of tracks in the data regions. Nevertheless, various exemplary embodiments of the present invention are also applicable to the following: a patterned medium having a recording layer that is divided at microscopic intervals both in the radial direction and the circumferential direction of the tracks; a magnetic disk having a recording layer of spiral configuration; a magnetic disk having a recording layer that is formed on the upper surfaces of convex portions and the bottom surfaces of concave portions of a concavo-convex patterned underlayer separately so that the portions formed on the upper surfaces of the convex portions serve as recording elements; and a magnetic disk having a continuous film of recording layer that is deposited in a concavo-convex pattern following a concavo-convex patterned underlayer. It will be appreciated that various exemplary embodiments of the present invention are also applicable to magnetic disks of longitudinal recording type. Various exemplary embodiments of the present invention are also applicable to magnetic recording media of two-sided recording type in which recording layers and the like are formed on both sides of the substrate. Furthermore, various exemplary embodiments of the present invention are also applicable to magneto-optical discs such as MO, heat assisted magnetic disks which use magnetism and heat in combination, and magnetic tapes and other magnetic recording media of non-disk configuration that have a recording layer of concavo-convex pattern.

EXAMPLES

Working Example

Three samples of the magnetic recording medium 10 according to the foregoing first exemplary embodiment were fabricated.

Specifically, the master 48 was fabricated in the master fabricating step (S102) under the following conditions.
 Thickness of the substrate 42: 2 mm
 Material of the substrate 42: Si
 Thickness of the mask layer 44: 7 nm
 Material of the mask layer 44: Ni
 Thickness of the resist layer 46: 60 nm
 Material of the resist layer 46: positive electron beam resist.
(Etching Condition for the Mask Layer 44)
 Etching method: IBE
 Processing gas: Ar
 Flow rate of Ar gas: 11 sccm
 Chamber pressure: 0.03 Pa
 Source power (plasma source power): 400 W
 Beam voltage: 500 V
 Beam current: 500 mA
 Suppressor voltage: −400 V
 Angle of irradiation of the ion beam: 90°
 Process time: 40 sec.
(Etching Condition for Removing the Resist Layer 46)
 Etching method: RIE
 Processing gas: $O_2$ Flow rate of $O_2$ gas: 50 sccm
Chamber pressure: 1.0 Pa
Source power (plasma source power): 1000 W
Bias power (the power applied to the workpiece 40): 20 W
Process time: 35 sec.

The bias power was applied only in the first 15 seconds. The remaining 20 seconds were without the bias power.

(Etching Condition for the Substrate 42)
Etching method: RIE
Processing gas: $CF_4+O_2$
Flow rate of $CF_4$ gas: 45 sccm
Flow rate of $O_2$ gas: 5 sccm
Chamber pressure: 1.0 Pa
Source power (plasma source power): 500 W
Bias power (the power applied to the workpiece 40): 20 W
Substrate temperature: 20° C.
Process time: 12 sec.

(Etching Condition for Removing the Mask Layer 44)
Etching method: wet etching
Etching solution: amidosulfuric acid (3 wt %).

The concave portions in the master 48 were such that the center parts of the bottom surfaces protruded from the edge parts of the bottom surfaces. Based on the master 48, the metal master fabricating step (S104), the metal mother fabricating step (S106), and the resin stamper fabricating step (S108) were performed to obtain a resin stamper 50.

Next, the workpiece starting body preparing step (S110) was performed to prepare a starting body of a workpiece 60 with the following configuration.

Thickness of the recording layer 14: 20 nm
Material of the recording layer 14: CoCrPt alloy
Thickness of the seed layer 26: 20 nm
Material of the seed layer 26: Ru
Thickness of the first mask layer 62: 30 nm
Material of the first mask layer 62: DLC
Thickness of the second mask layer 64: 4 nm
Material of the second mask layer 64: Ni.

Next, the resin layer forming step (S112) was performed to form a resin layer 66 under the following condition.

Imprinting method: optical (ultraviolet) imprinting
Thickness (thickness of application) of the resin layer 66: 35 nm
Material of the resin layer 66: ultraviolet curable resin.

The concave portions in the resin layer 66 were such that the center parts of the bottom surfaces protruded from the edge parts of the bottom surfaces.

Next, the recording layer processing step (S114) was performed to process the recording layer 14 into a concavo-convex pattern under the following conditions.

(Etching Condition for the Resin Layer 66 and the Second Mask Layer 64)
Etching method: IBE
Processing gas: Ar
Flow rate of Ar gas: 5 sccm
Chamber pressure: 0.003 Pa
Source power (plasma source power): 200 W
Beam voltage: 1000 V
Beam current: 100 mA
Suppressor voltage: −500 V
Angle of irradiation of the ion beam: 90°
Process time: 18 sec.

The etching was stopped when the resin layer 66 and the second mask layer 64 were removed from the bottoms of the concave portions to expose the first mask layer 62 in the concave portions. As shown in FIG. 12, the upper surfaces of the first mask layer 62 in the concave portions (the bottom surfaces of the concave portions) were shaped so that the center parts protruded from the edge parts.

(Etching Condition for the First Mask Layer 62)
Etching method: IBE
Processing gas: $O_2$
Flow rate of $O_2$ gas: 20 sccm
Chamber pressure: 0.035 Pa
Beam voltage: 500 V
Beam current: 70 mA
Suppressor voltage: −500 V
Angle of irradiation of the ion beam: 90°
Process time: 40 sec.

The etching of the first mask layer 62 was stopped when the etching reached the upper surface of the recording layer 14 at the edge parts of the concave portions as shown in FIG. 13. The first mask layer 62 remained on the bottom surfaces of the concave portions, whereas the first mask layer 62 disappeared from the edge parts of the bottom surfaces of the concave portions. The upper surfaces of the first mask layer 62 in the concave portions (the bottom surfaces of the concave portions) were shaped so that the center parts protruded from the edge parts. In the concave portions, the first mask layer 62 had a thickness of approximately 1 nm in the center parts.

(Etching Condition for the Recording Layer 14)
Etching method: IBE
Processing gas: Ar
Flow rate of Ar gas: 5 sccm
Chamber pressure: 0.003 Pa
Source power (plasma source power): 200 W
Beam voltage: 1000 V
Beam current: 100 mA
Suppressor voltage: −1500 V
Angle of irradiation of the ion beam: 90°
Process time: 16 sec.

As shown in FIG. 14, the recording layer 14 was thereby divided in a large number of recording elements 14A. In the data regions, the recording elements 14A had a width of 43 nm in the track width direction (radial direction). In the data regions, the concave portions 16 had a width of 35 nm in the track width direction. The upper surfaces of the seed layer 26 in the concave portions 16 between the recording elements 14A (the bottom surfaces of the concave portions 16) were shaped so that the center parts protruded from the edge parts. The upper surfaces of the seed layer 26 in the center parts of the concave portions 16 were almost at the same level as the lower surfaces of the recording elements 14A. The upper surfaces of the seed layer 26 at the edge parts of the concave portions 16 were at a level approximately 4 nm lower than the lower surfaces of the recording elements 14A.

Next, the filler material depositing step (S116) was performed to form filler portions 18 in the concave portions 16 under the following condition.

(Deposition Condition for the Filler Material 17)
Deposition method: bias sputtering
Filler material (target): $SiO_2$
Deposition gas: Ar
Flow rate of Ar gas: 155 sccm
Chamber pressure: 9 Pa
Source power (the power applied to the target): 500 W
Bias power (the power applied to the workpiece 60): 5.6 W
Deposition thickness (the thickness in the concave portions 16): 50 nm.

Next, the flattening step (S118) was performed to remove the excess of the filler material 17 and the first mask layer 62 under the following condition, whereby the upper surfaces of the recording elements 14A and those of the filler portions 18 were flattened.

(Etching Condition for the Filler Material 17)
 Etching method: IBE
 Processing gas: Ar
 Flow rate of Ar gas: 5 sccm
 Chamber pressure: 0.003 Pa
 Source power (plasma source power): 200 W
 Beam voltage: 500 V
 Beam current: 100 mA
 Suppressor voltage: −500 V
 Angle of irradiation of the ion beam: 90°
 Process time: 200 sec.

The etching was stopped when the upper surfaces of the filler portions 18 (at the edge parts) reached almost the same level as the upper surfaces of the recording elements 14A.
(Etching Condition for Removing the First Mask Layer 62)
 Etching method: RIE
 Processing gas: $N_2$
 Flow rate of $N_2$ gas: 50 sccm
 Chamber pressure: 1 Pa
 Source power (plasma source power): 1000 W
 Bias power (the power applied to the workpiece 60): 15 W
 Angle of irradiation of the processing gas: 90°
 Process time: 90 sec.

The three samples of the magnetic recording medium 10 were obtained as described above. Neither the protective layer 28 nor the lubricant layer 30 was formed.

The samples were measured for the difference in level between the upper surfaces of the filler portions 18 and those of the recording elements 14A. Specifically, each sample was measured for the difference in level at 10 points in data regions and 10 points in servo regions by using an atomic force microscope (AFM). At the measuring points in the servo regions, the recording elements 14A had a width of 100 nm in the circumferential direction of the tracks. At the measuring points in the servo regions, the concave portions 16 had a width of 100 nm in the circumferential direction of the tracks. Table 1 shows the measurements.

TABLE 1

| Samples | | Difference in height (nm) | |
| --- | --- | --- | --- |
|  |  | Data region | Servo region |
| Working example | 1 | −0.5 | −1.0 |
|  | 2 | 0.2 | 0.8 |
|  | 3 | −0.7 | −0.9 |
| Comparative example | 1 | 1.6 | 2.8 |
|  | 2 | 1.5 | 3.9 |
|  | 3 | 1.8 | 3.4 |

Each of the differences in height in the data regions and servo regions in Table 1 is an arithmetic mean value of the measurements at the 10 measuring points. Negative values indicate that the upper surface of the filler portion 18 is at a level higher than the upper surface of the recording element 14A.

Comparative Example

In the working example described above, a chamber pressure of 1.0 Pa was employed when etching the substrate 42 in the master fabricating step (S102). For a comparative example, the chamber pressure was set at 0.18 Pa when etching the substrate 42 in the master fabricating step (S102). In other respects, a master of the comparative example was fabricated under the same conditions as in the working example.

The concave portions in the master had almost flat bottom surfaces. Based on the master, the metal master fabricating step (S104), the metal mother fabricating step (S106), and the resin stamper fabricating step (S108) were performed to obtain a resin stamper. The convex portions of the resin stamper also had almost flat upper surfaces. The resin layer forming step (S112) was performed by using the resin stamper. The concave portions in the resin layer 66 had almost flat bottom surfaces. The bottoms of the concave portions of the resin layer 66 were thinner than the center parts of the bottoms of the concave portions of the resin layer 66 in the working example.

Next, the recording layer processing step (S114) was performed to process the recording layer 14 into a concavo-convex pattern. In the step of etching the resin layer 66 and the second mask layer 64, the etching was stopped when the first mask layer 62 was exposed in the concave portions as in the working example. The first mask layer 62 had almost flat upper surfaces in the concave portions. Portions of the first mask layer 62 remaining on the bottoms of the concave portions were thinner than the center parts of portions of the first mask layer 62 remaining on the bottoms of the concave portions in the working example. In the step of etching the first mask layer 62, the etching of the first mask layer 62 was stopped when the etching reached the upper surface of the recording layer 14 in the concave portions. The first mask layer 62 disappeared from the bottoms of the concave portions. In the step of etching the recording layer 14, the etching was stopped when the upper surfaces of the seed layer 26 in the concave portions 16 between the recording elements 14A reached a level lower than the lower surfaces of the recording elements 14A. The seed layer 26 had almost flat upper surfaces. The difference in level between the upper surfaces of the seed layer 26 in the concave portions and the lower surfaces of the recording elements 14A was approximately 4 nm. This value is almost the same as the difference in level between the upper surfaces of the seed layer 26 at the edge parts of the concave portions 16 and the lower surfaces of the recording elements 14A according to the working example.

Figure 23:
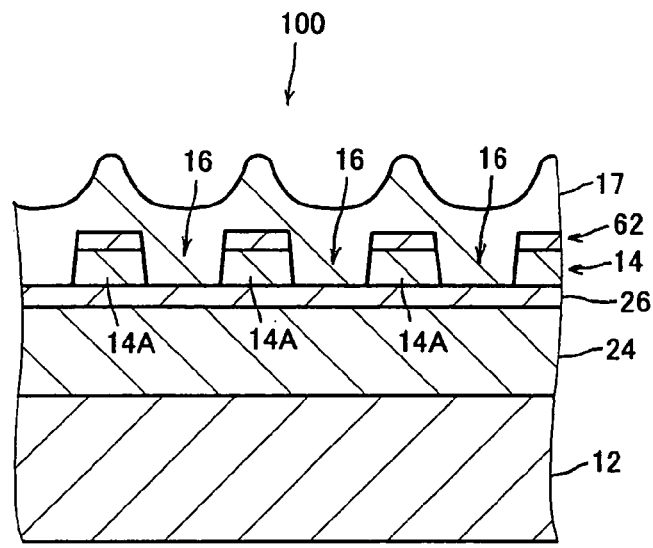
FIG. 23 is a sectional side view schematically showing the configuration of a workpiece with a filler material deposited over a recording layer according to a comparative example.

Next, the filler material depositing step (S116) was performed to form the filler portions 18 in the concave portions 16 as in the working example. As shown in FIG. 23, the areas of the upper surface of the filler material 17 corresponding to the corners of the concavo-convex pattern of the recording layer 14 were shaped slightly rounder than the corners of the concavo-convex pattern of the recording layer. The filler material 17 was thicker over the edge parts of the concave portions 16 of the concavo-convex pattern of the recording layer 14 than over the center parts of the concave portions 16.

Figure 24:
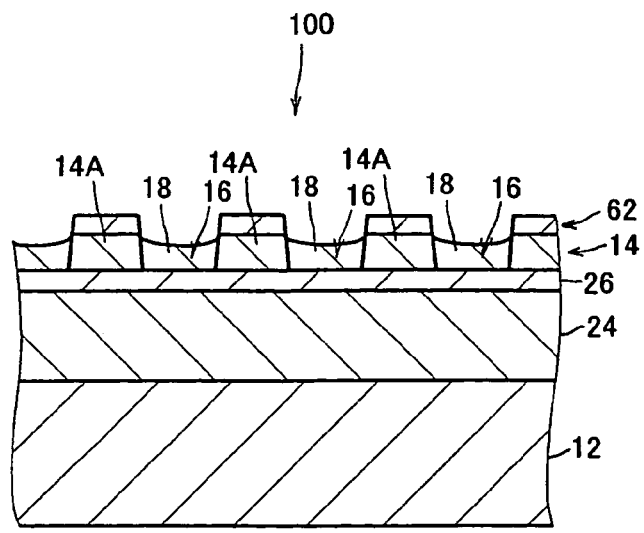
FIG. 24 is a sectional side view schematically showing the configuration of the workpiece with an excess of the filler material removed.

Next, the flattening step (S118) was performed as in the working example, whereby the upper surfaces of the recording elements 14A and those of the filler portions 18 were flattened. When an excess of the filler material 17 was etched off (when the edge parts of the upper surfaces of the filler portions 18 reached almost the same level as the upper surfaces of the recording elements 14A), the upper surfaces of the filler material 17 filling the concave portions 16 were shaped so that the center parts sank to the substrate side as compared to the edge parts as shown in FIG. 24. The first mask layer 62 was further removed to obtain samples of the magnetic recording medium. Like the working example, neither the protective layer 28 nor the lubricant layer 30 was formed. Three samples of the magnetic recording medium were obtained as in the working example.

As in the working example, the samples of the comparative example were measured for the difference in level between the upper surfaces of the filler portions 18 and those of the recording elements 14A. The measurements are also included in Table 1.

As shown in Table 1, the measurements of the difference in level between the upper surfaces of the filler portions 18 and the upper surfaces of the recording elements 14A according to the working example were significantly smaller than those of the comparative example. More specifically, all the measurements of the comparative example were 1.5 nm or greater. Meanwhile, all the measurements (in absolute value) of the working example were smaller than or equal to 1 nm.

In the comparative example, as described above, the filler material 17 deposited in the filler material depositing step (S116) was shaped so that the upper surface was roundish in the areas corresponding to the corners of the concavo-convex pattern of the recording layer 14 as shown in FIG. 23. The upper surface of the filler material 17 was higher over the edge parts of the concave portions 16 of the concavo-convex pattern of the recording layer 14 than over the center parts of the concave portions 16. Consequently, the flattening step (S118) left a difference in the height of the upper surface of the filler material 17 between over the edge parts of the concave portions 16 and over the center parts of the concave portions 16. As shown in FIG. 24, the upper surfaces of the filler portions 18 filling the concave portions 16 were thus shaped so that the center parts sank to the substrate side as compared to the edge parts. Such a configuration is considered to have been responsible for the large differences in level between the upper surfaces of the filler portions 18 and those of the recording layers 14A.

In contrast, according to the working example, the center parts 16A of the bottom surfaces of the concave portions 16 protruded from the edge parts 16B of the bottom surfaces in the direction away from the substrate 12. As shown in FIG. 15, the difference in the height of the upper surface of the deposited filler material 17 between over the edge parts of the concave portions 16 and over the center parts of the concave portion 16 was thus smaller than when the concave portions 16 had a flat bottom surfaces as in the comparative example. Consequently, the difference in the height of the upper surface of the filler material 17 between over the edge parts of the concave portions 16 and over the center parts of concave portions 16 was thus suppressed to be small in the flattening step (S118). Such a configuration is considered to have reduced the difference in level between the upper surfaces of the filler portions 18 and those of the recording elements 14A.

In other words, it was confirmed that, according to the working example of the present invention where the center parts 16A of the bottom surfaces of the concave portions 16 protrude from the edge parts 16B of the bottom surfaces in the direction away from the substrate 12, the surface of the magnetic recording medium can be made flatter than when the concave portions 16 have flat bottom surfaces as in the comparative example. Incidentally, the difference in level between the upper surfaces of the filler portions 18 and those of the recording elements 14A was greater in the servo regions than in the data regions both in the working example and the comparative example. The reason for this is that the concave portions 16 had a greater width in the servo regions than in the data regions, and the filler portions 18 filling the concave portions 16 had a greater difference in height between the center parts of the upper surfaces and the edge parts of the upper surfaces. The greater the width of the concave portions between the recording elements is, the greater the difference in height between the center parts of the upper surfaces of the filler portions filling the concave portions and the edge parts of the upper surfaces of the same tends to be. Thus, in the data regions where the concave portions have a relatively small width, the difference in height between the center parts of the upper surfaces of the filler portions filling the concave portions and the edge parts of the upper surfaces of the same can sometimes be as small as practically insignificant even if the concave portions have flat bottom surfaces. In such a case, the concave portions of relatively small width in the data regions may be formed with flat bottom surfaces while the concave portions of relatively large width in the servo regions are shaped so that the centers of the bottom surfaces protrude from the edge parts of the bottom surfaces in the direction away from the substrate. Note, however, that the data regions are significantly larger than the servo regions in area. When the data regions of larger area are configured so that the center parts of the bottom surfaces of the concave portions protrude from the edge parts of the bottom surfaces in the direction away from the substrate to result in precise surface flattening, the effect of stabilizing the flying height of a magnetic head can thus be provided even if the concave portions in the servo regions are shaped to have flat bottom surfaces.

INDUSTRIAL APPLICABILITY

Various exemplary of embodiments of the present invention are applicable to a magnetic recording medium having a recording layer of concavo-convex pattern, such as a discrete track medium and a patterned medium.

REFERENCE SIGNS LIST

2—magnetic recording and reproducing apparatus
4—magnetic head
10, 70, 80, 90—magnetic recording medium
12, 42—substrate
14—recording layer
14A—recording element
16—concave portion
16A—center part of bottom surface
16B—edge part of bottom surface
17—filler material
18—filler portion
24—soft magnetic layer
26—seed layer
28—protective layer
30—lubricant layer
40, 60, 100—workpiece
44—mask layer
46—resist layer
48—master
50—resin stamper
62—first mask layer
64—second mask layer
66—resin layer
S102—master fabricating step
S104—metal master fabricating step
S106—metal mother fabricating step
S108—resin stamper fabricating step
S110—workpiece starting body preparing step
S112—resin layer forming step
S114—recording layer processing step
S116—filler material depositing step
S118—flattening step
S120—protective layer depositing step
S122—lubricant layer depositing step

The invention claimed is:

1. A magnetic recording medium comprising:
   a substrate;
   a recording layer formed in a predetermined concavo-convex pattern over the substrate, convex portions of the concavo-convex pattern serving as recording elements; and
   a filler portion filling a concave portion between the recording elements, wherein
   the concave portion has a bottom surface having an arcuate cross section protruding in a direction away from the substrate, and a center part of the bottom surface protrudes from edge parts of the bottom surface in the direction away from the substrate.

2. The magnetic recording medium according to claim 1, wherein
   a lower surface of the recording layer is divided at least at the edge parts of the bottom surface of the concave portion.

3. The magnetic recording medium according to claim 2, further comprising
   an underlayer arranged between the recording layer and the substrate so as to be in contact with the lower surface of the recording layer, and wherein
   the underlayer has a continuous lower surface.

4. The magnetic recording medium according to claim 3, wherein:
   the underlayer is exposed from the recording layer in the concave portion; and
   a portion of the underlayer under the recording element has almost the same thickness as that of a portion of the underlayer under the center part of the concave portion.

5. A magnetic recording and reproducing apparatus comprising:
   the magnetic recording medium according to claim 1; and
   a magnetic head for recording and reproducing a magnetic signal on/from the magnetic recording medium.

6. A magnetic recording and reproducing apparatus comprising:
   the magnetic recording medium according to claim 2; and
   a magnetic head for recording and reproducing a magnetic signal on/from the magnetic recording medium.

7. A magnetic recording and reproducing apparatus comprising:
   the magnetic recording medium according to claim 3; and
   a magnetic head for recording and reproducing a magnetic signal on/from the magnetic recording medium.

8. A magnetic recording and reproducing apparatus comprising:
   the magnetic recording medium according to claim 4; and
   a magnetic head for recording and reproducing a magnetic signal on/from the magnetic recording medium.

* * * * *